March 26, 1968 — H. W. KOMPANEK — 3,375,489
PRESSURE COMPENSATED TRANSDUCER
Filed March 14, 1966
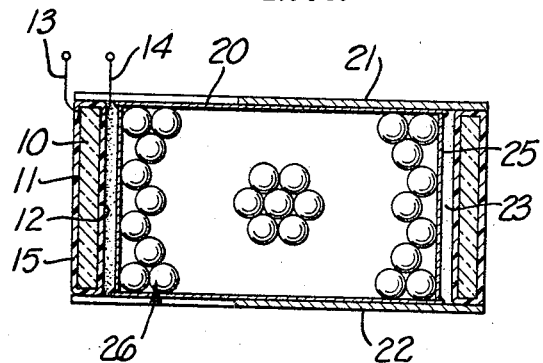
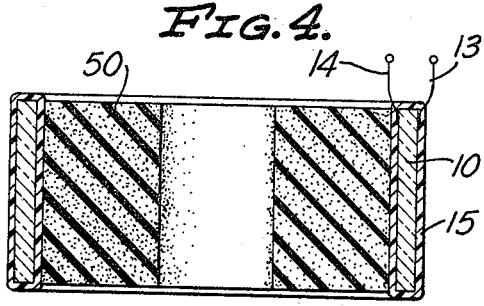
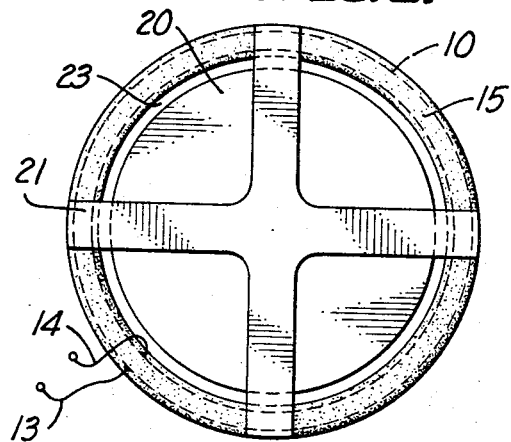
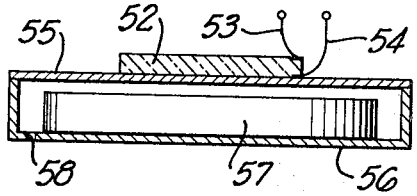
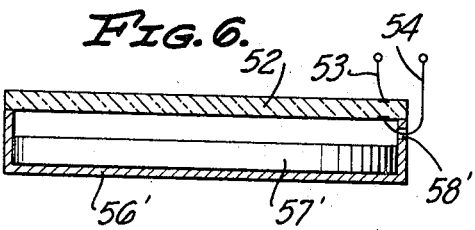
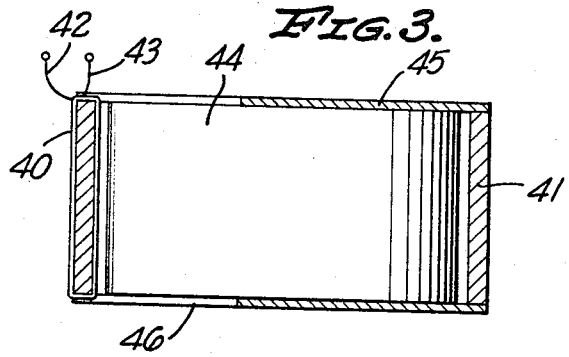
INVENTOR.
HARRY W. KOMPANEK
BY HIS ATTORNEYS
HARRIS, KIECH, RUSSELL & KERN

United States Patent Office 3,375,489
Patented Mar. 26, 1968

3,375,489
PRESSURE COMPENSATED TRANSDUCER
Harry W. Kompanek, 153 Rametto Road,
Santa Barbara, Calif. 93103
Filed Mar. 14, 1966, Ser. No. 534,022
12 Claims. (Cl. 340—11)

ABSTRACT OF THE DISCLOSURE

A transducer particularly suited for operation in deep water. A ring of piezoelectric or magnetostrictive material with a core disposed within and spaced from the ring permitting exposure of both faces of the ring to the water, with the core having a sound velocity lower than that of the water. An alternative structure utilizing a disc with both faces exposed to the water and with a core spaced from one face. Another alternative structure utilizing a piece of foam rubber as the core, with the foam rubber attached to one face of the ring or disc and with the other surfaces of the rubber exposed to the water.

---

This invention relates to transducers of the mechanical-to-electrical type and, in particular, to a new and improved pressure compensated transducer. While the transducer was referred to above as a mechanical-to-electrical transducer, it should be kept in mind that the transducer can be excited electrically to produce a mechanical output or can be driven mechanically to produce an electrical output, i.e., the transducer can be used either as a transmitter or as a receiver. The principal uses for such transducers at the present time are in the fields of underwater acoustics and ultrasonics.

It is often desirable to utilize transducers in mediums at superatmospheric pressures, typically in the ocean at depths ranging from sea level with a pressure of zero p.s.i.g. to 18,000 feet below sea level with a pressure of approximately 9000 p.s.i.g. and greater.

In one form, a typical transducer will comprise a sleeve or ring or toroid of a material which changes shape when electrically excited. The ends of the sleeve are sealed to prevent entry of the medium such as sea water and the device is positioned in the medium for use. Another form of transducer comprises a disc or wafer of the working material which may be supported at its periphery permitting a bending or cupping motion. The disc may be used alone or may be mounted on a larger metal disc. One face is exposed to the medium and the other face may be exposed to the sealed air space. Serious problems are encountered in such devices with leakage at the seals and with breakage of the sleeve or disc, since the working materials are not particularly strong. Accordingly, it is an object of the present invention to provide a new and improved transducer particularly suited for use at superatmospheric pressures and one which eliminates the problems of leakage and breakage. A further object is to provide such a transducer which is directly compensated for the pressure of the medium in which the transducer is operated.

It is an object of the invention to provide a new and improved transducer for operation in a medium and including a working member of a material which changes shape when electrically excited, and a core member having a sound velocity less than that of the medium and mounted adjacent the working member.

It is an object of the invention to provide a new and improved pressure compensated transducer in which the working member of the operative material is exposed to the medium on both its interior and exterior surfaces. A further object is to provide such a structure having a core spaced from the working member with the core having a construction providing a mismatch of sound velocity with the medium. An additional object is to provide a variety of core constructions which will function in the transducer.

It is a particular object of the invention to provide a transducer utilizing a closed-cell foam-like material for the core member in engagement with the working member.

Other objects, advantages, features and results will more fully appear in the course of the following description. The drawing merely shows and the description merely describes preferred embodiments of the present invention which are given by way of illustration or example.

In the drawing:
FIG. 1 is a sectional view of a piezoelectric type of transducer embodying the teaching of the invention;
FIG. 2 is a top view of the transducer of FIG. 1;
FIG. 3 is a view similar to that of FIG. 1 showing a magnetostrictive type of transducer;
FIG. 4 is a view similar to that of FIG. 1 showing a foam-type core;
FIG. 5 is a sectional view of a transducer incorporating a disc-shaped working member; and
FIG. 6 is a sectional view of an alternate form of the transducer of FIG. 5.

One embodiment of the transducer of the invention includes a sleeve of material which changes shape when electrically excited. A piezoelectric material, such as one of the piezoelectric ceramics currently available, will exhibit a mechanical change when an electrical potential is applied across the material. Magnetostrictive materials, such as magnetostrictive ferrites and nickel, also exhibit a physical change when exposed to a magnetic field produced by an electric coil disposed about the material. Conversely, these materials when stressed mechanically to produce changes will generate electrical signals, permitting use of the materials both as transmitters and receivers.

The transducer illustrated in FIGS. 1 and 2 includes a sleeve 10 of a piezoelectric ceramic as the working member. A conductive coating 11 of silver or the like is applied on the outer surface and a similar conductive coating 12 is applied on the inner surface. A lead wire 13 is connected to the coating 11 and another lead wire 14 is connected to the coating 12 for coupling the transducer to an electrical circuit. While the sleeve 10 is illustrated herein as a cylindrical tube, it should be noted that the invention may be utilized with any suitable form of transducer sleeve.

When desired, the sleeve 10 may be potted or encapsulated in the conventional manner to provide an insulating coating over the conductive coatings and to provide protection against corrosion. A potting layer is indicated at 15 in FIGS. 1 and 2.

A core 20 is positioned within the sleeve 10, as by spiders 21, 22. The core is spaced from the sleeve providing an annular zone 23 between the core and sleeve. The annular zone 23 is open at the end permitting free flow therein of the sea water or other medium in which the transducer is positioned.

The core 20 is constructed to have a sound velocity lower than that of the medium in which the transducer is to operate. Various forms may be utilized for the core and a preferred structure is illustrated in FIG. 1. A container 25 is filled with support members, typically balls 26, and is then sealed prior to being attached to the sleeve 10 by the spiders 21, 22. Typically, the container 25 may comprise a stainless steel sleeve with stainless steel end caps welded thereon. Typically, the balls 26 may be hollow steel or glass or solid lead. Ordinarily, the space around the balls is filled with air, but other gases or a vacuum could be used. The important criterion is that the sound velocity in the space within the container be lower than the sound velocity of the medium in which the transducer is positioned. The sound velocity in water is about 5,000 feet per second and varies to a small degree with depth and temperature. In contrast, the velocity of sound in air is about 1,000 feet per second, and in lead about 4,000 feet per second.

It is desirable that the sound velocity in the medium be at least about 20 percent greater than the sound velocity in the core member, and preferably that it be several times greater.

In a preferred arrangement, the container itself may be made strong enough to resist the pressure of the medium and the internal support members may be omitted, leaving the container filled or with a vacuum.

The transducer of the invention is utilized in the same manner as conventional transducers. If the device is to serve as an acoustical pickup, the leads 13, 14 may be connected to an amplifier for driving a meter or recorder. If the device is to act as an acoustical transmitter, an oscillator and amplifier may provide an exciting voltage for connection to the leads 13, 14.

FIG. 3 illustrates an alternative form of sleeve and an alternative form of core. Of course, the sleeve of FIG. 3 could be used with the core of FIG. 1 and the core of FIG. 3 could be used with the sleeve of FIG. 1. A coil of wire 40 is provided around a sleeve 41 of magnetostrictive material, with leads 42, 43 for connecting the coil to the associated circuitry. The number of turns on the coil is a matter of design and often only a single-turn coil is used. The sleeve may be potted in the same manner as the sleeve of FIGS. 1 and 2 if desired. A core 44 is positioned within the sleeve 41 and may be supported by spiders 45, 46 in the same manner as the core 20 of FIG. 1. The core 44 is a solid piece of metal, such as lead, having a sound velocity lower than that of the medium in which the transducer is to operate.

The transducer with the core spaced from the sleeve is especially suitable for operation at high ambient pressures such as are encountered in deep water. The problems of damage to the transducer sleeve and of leakage at the end seals are eliminated. At the same time, high sensitivity and high efficiency are achieved. The size of the space between the core and sleeve is not critical but desirably is made relatively small since the sensitivity and efficiency of the transducer will be a function of the volume of the core. In a typical device, the inside diameter of the sleeve is two inches, the sleeve is one inch high, and the clearance between the core and the sleeve is one-sixteenth inch.

An alternative form of the transducer best suited for operation in shallow water is illustrated in FIG. 4. The encapsulated sleeve 10 of FIG. 1 may be utilized as the working member. A core 50 of a closed-cell foam-type material, such as a foam rubber, is positioned within and in contact with the sleeve. The core 50 may be in the form of an annulus as shown in FIG. 4, or may be a solid cylinder. The core material should be sufficiently flexible so as not to adversely affect the operation of the sleeve by restricting or dampening its mechanical movement. The closed cell construction for the foam-type material is desired in order to prevent entry of the medium, such as sea water, into the core. Since the core consists primarily of entrapped air, it will have a sound velocity close to that of air and will work in the same manner as the cores previously described. However, since the core is compressible and is in direct contact with the sleeve or working member, it is not particularly suitable for use at depths where high pressures are encountered.

An alternative embodiment of the invention utilizing a working member in the form of a wafer or disc is illustrated in FIGS. 5 and 6. Referring to FIG. 5, a piezoelectric ceramic disc or wafer 52 with the usual conductive coatings on both faces and leads 53, 54 is mounted on a metal disc 55. A cup-shaped member 56, typically of stainless steel or the like, is fixed to the disc 55 at the periphery thereof. A core 57 is carried within the cup-shaped member 56 and one or more openings 58 provide for communication between the interior and the exterior of the structure. The core 57 may take various of the forms described above, e.g., an empty container, a container filled with reinforcing balls or a solid block of metal such as lead.

In operation, the application of a voltage to the leads 53, 54 produces a bending or cupping action of the discs 52, 55. Similarly, application of a force to the exposed face of the disc 52 producing bending, results in a voltage being developed at the leads 53, 54. The space between the core and the disc or working member is filled with the medium in which the transducer is positioned, thereby providing the pressure compensation, and the adjacent core provides the lower sound velocity, as in the sleeve-type transducer previously described.

An alternate form is shown in FIG. 6, illustrating the use of the ceramic disc 52 without the additional metal disc 55. In this particular arrangement, the core 57' fills the lower portion of the cup member 56', with the access openings 58' disposed above the core. Otherwise the construction and operation is the same as that illustrated in FIG. 5. In another alternative form, a foam rubber or similar material could be used for the core, with the core in contact with the disc, providing operation in the same manner as the device of FIG. 4.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. A mechanical-to-electrical transducer for positioning within a medium, including in combination:
   a working member of material which changes shape when electrically excited and having opposed surfaces;
   a core member having a sound velocity less than that of said medium and being substantially less compressible than said medium; and means for mounting said core member spaced from said working member and providing exposure of both of said surfaces to the pressure of the medium.

2. A transducer as defined in claim 1 in which said working member comprises a piece of piezoelectric material, and with electrical conductors disposed on opposing surfaces of said piece, and means for connecting said conductors into an electrical circuit.

3. A transducer as defined in claim 1 in which said working member comprises a piece of magnetostrictive material, and with an electrical coil disposed about said piece, and means for connecting said coil into an electrical circuit.

4. A transducer as defined in claim 1 in which the sound velocity of said medium is at least about 20 percent greater than the sound velocity of said core member.

5. A transducer as defined in claim 1 in which the sound velocity of said medium is at least several times greater than the sound velocity of said core member.

6. A transducer as defined in claim 1 in which said working member is in the form of a sleeve and said core member is positioned within said sleeve.

7. A transducer as defined in claim 1 in which said working member is in the form of a disc and said core member is positioned adjacent one face of the disc.

8. A mechanical-to-electrical transducer for positioning within a medium, including in combination:
   a working member of material which changes shape when electrically excited and having opposed surfaces;

a core member having a sound velocity less than that of said medium; and means for mounting said core member spaced from said working member providing a substantially constant width zone therebetween for said medium and providing exposure of both surfaces to the pressure of the medium.

9. A transducer as defined in claim 8 in which said core member comprises a substantially solid piece of metal.

10. A transducer as defined in claim 8 in which said core member comprises a closed container.

11. A transducer as defined in claim 8 in which said core member comprises a closed container with a plurality of support members therein for preventing collapse of said container.

12. A transducer as defined in claim 8 in which said core member comprises a closed container filled with balls for preventing collapse of said container.

References Cited

UNITED STATES PATENTS

| | | | |
|---|---|---|---|
| 2,830,020 | 4/1958 | Harris. | |
| 2,978,670 | 4/1961 | Peek | 340—11 |
| 3,068,446 | 12/1962 | Ehrlich et al. | 340—10 |
| 2,406,767 | 9/1946 | Hayes | 340—10 |
| 2,961,636 | 11/1960 | Benecke | 340—8 |
| 3,262,093 | 7/1966 | Junger et al. | 340—10 |
| 3,302,163 | 1/1967 | Andrews | 340—8 |

RODNEY D. BENNETT, *Primary Examiner.*

B. L. RIBANDO, *Assistant Examiner.*